US011136695B2

(12) United States Patent
Sharma et al.

(10) Patent No.: US 11,136,695 B2
(45) Date of Patent: Oct. 5, 2021

(54) METHODS AND DEVICES FOR MULTI-LAYER NANOFIBERS

(71) Applicant: University of Georgia Research Foundation, Inc., Athens, GA (US)

(72) Inventors: Suraj Sharma, Watkinsville, GA (US); Darya Asheghali, Athens, GA (US); Sergiy Minko, Athens, GA (US); Nataraja Sekhar Yadavalli, Athens, GA (US); Huipu Gao, Athens, GA (US)

(73) Assignee: The University of Georgia Research Foundation, Inc, Athens, GA (US)

( * ) Notice: Subject to any disclaimer, the term of this patent is extended or adjusted under 35 U.S.C. 154(b) by 272 days.

(21) Appl. No.: 16/412,608

(22) Filed: May 15, 2019

(65) Prior Publication Data

US 2019/0352803 A1    Nov. 21, 2019

Related U.S. Application Data

(60) Provisional application No. 62/672,416, filed on May 16, 2018.

(51) Int. Cl.
*B29C 41/30* (2006.01)
*B29C 41/36* (2006.01)
(Continued)

(52) U.S. Cl.
CPC ............ *D01F 8/00* (2013.01); *B29C 48/15* (2019.02); *B29C 48/92* (2019.02); *D01D 5/00* (2013.01);
(Continued)

(58) Field of Classification Search
CPC ......... B29C 41/30; B29C 41/36; B29C 41/52; B29C 48/15; B29C 48/92; B29C 2948/9258; D01D 4/02; D01D 5/04; D01D 5/06; D01D 5/08; D01D 5/18; D01D 5/34; D01D 13/00; D01D 13/02; D01F 8/04; D02G 3/04; D02G 3/36; D02G 3/38
(Continued)

(56) References Cited

U.S. PATENT DOCUMENTS

2010/0148404 A1\* 6/2010 Smida .................. D01D 5/18
264/465

OTHER PUBLICATIONS

Tokarev, A.; Asheghali, D.; Griffiths, I. M.; Trotsenko, O.; Gruzd, A.; Lin, X.; Stone, H. A.; Minko, S. Touch-and Brush-Spinning of Nanofibers. Advanced Materials 2015, 27 (41), 6526-6532.

\* cited by examiner

*Primary Examiner* — Leo B Tentoni
(74) *Attorney, Agent, or Firm* — Thomas | Horstemeyer, LLP; Stephanie Davy-Jow

(57) ABSTRACT

Nanofiber spinning apparatuses and methods for making core-sheath materials using touch spinning are provided. The apparatus includes at least one rotating plate with an aperture through which a core yarn passes and at least one post contacting the rotating plate. A speed control device can be configured to control rotation of the rotating plate, and a dispensing device can be configured to dispense a nanofiber-forming material onto the post. To make a core-sheath yarn a core yarn is passed through an aperture in a rotating plate having at least one post. The post is contacted with a nanofiber-forming material the rotating plate is rotated to draw a fiber of nanofiber-forming material from the post to wrap the fiber around the core yarn.

19 Claims, 9 Drawing Sheets

(51) Int. Cl.
  *B29C 41/52*      (2006.01)
  *D01D 4/02*       (2006.01)
  *D01D 5/04*       (2006.01)
  *D01D 5/06*       (2006.01)
  *D01D 5/08*       (2006.01)
  *D01D 5/18*       (2006.01)
  *D01D 13/00*      (2006.01)
  *D01D 13/02*      (2006.01)
  *D01F 8/04*       (2006.01)
  *D02G 3/04*       (2006.01)
  *D02G 3/36*       (2006.01)
  *D02G 3/38*       (2006.01)
  *D01F 8/00*       (2006.01)
  *D01D 5/00*       (2006.01)
  *B29C 48/92*      (2019.01)
  *B29C 48/15*      (2019.01)
  *D01D 5/34*       (2006.01)

(52) U.S. Cl.
  CPC ........ *B29C 2948/9258* (2019.02); *D01D 5/34* (2013.01)

(58) Field of Classification Search
  USPC ........ 264/40.1, 164, 171.12, 171.14, 171.17, 264/171.18, 171.2, 172.15, 211.1, 310, 264/311, 349; 425/113, 131.5, 135, 224, 425/319, 325, 376.1, 382.2, 447, 461
  See application file for complete search history.

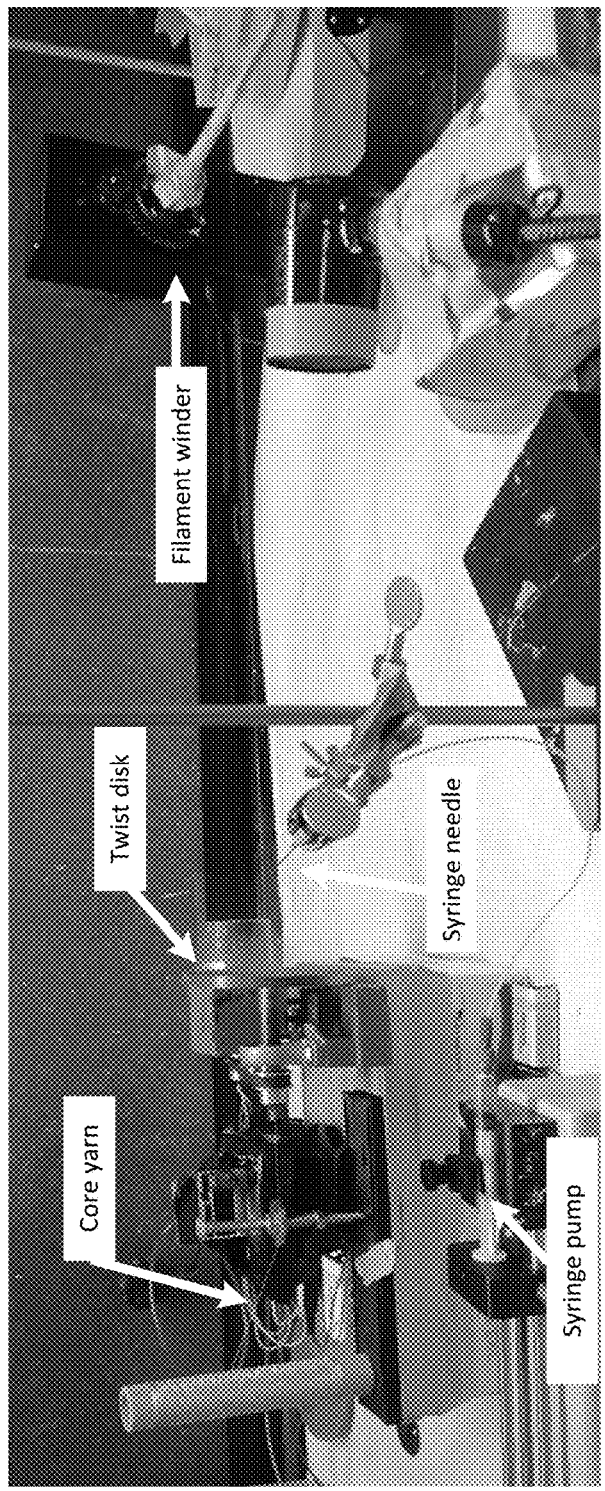
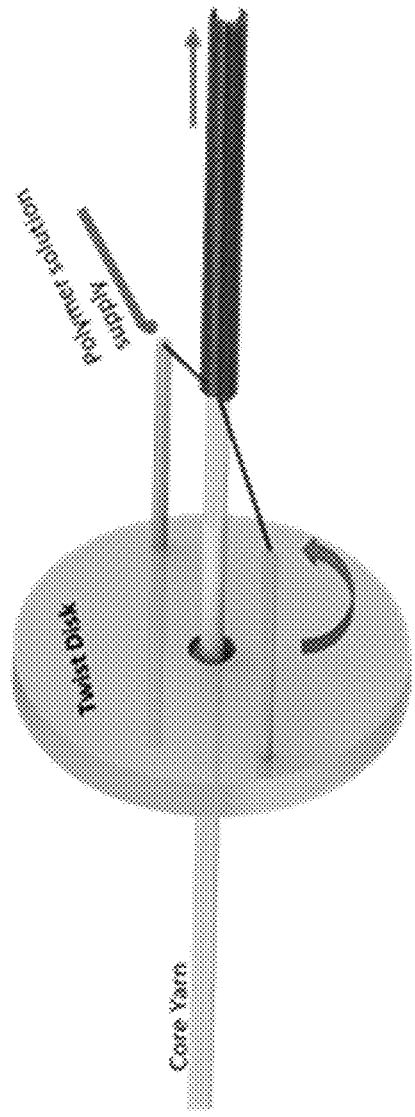
Fig. 6A
Fig. 6B

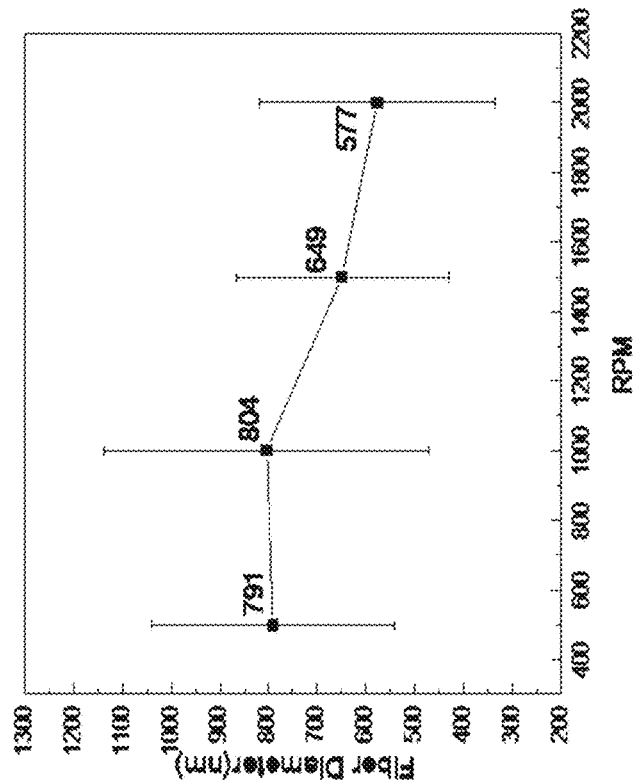
Fig. 7A
Fig. 7B
Fig. 7C
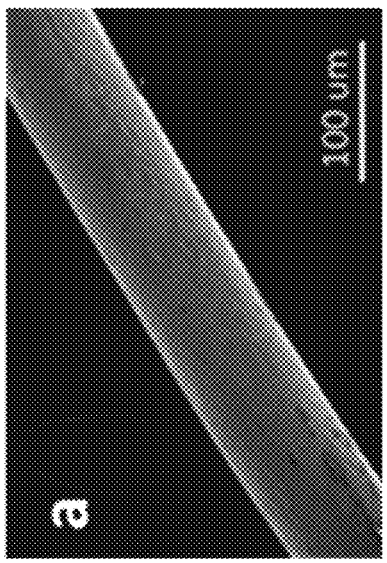
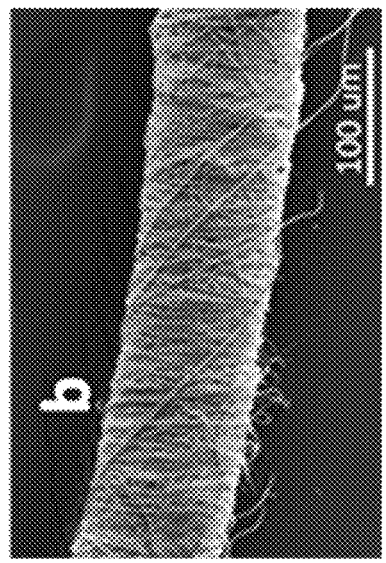
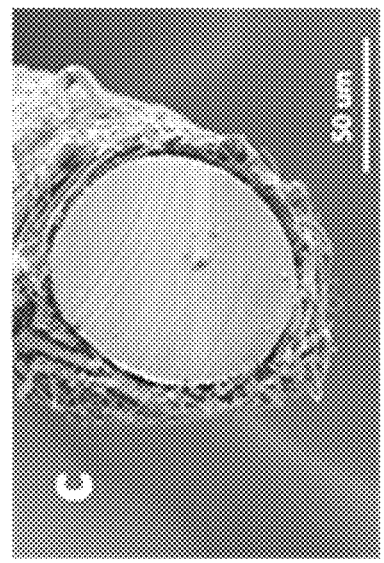
Fig. 8

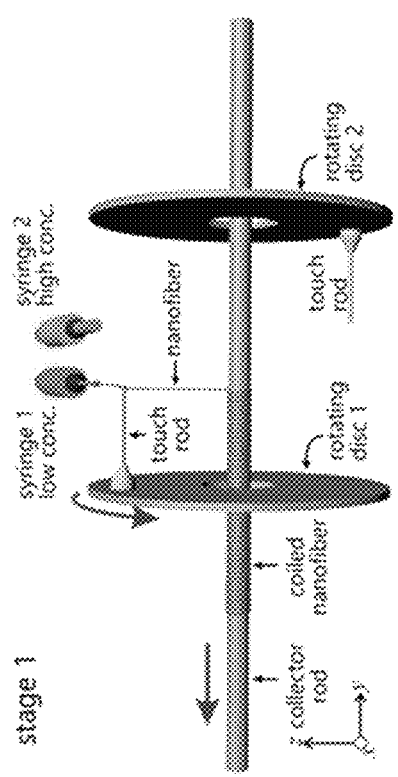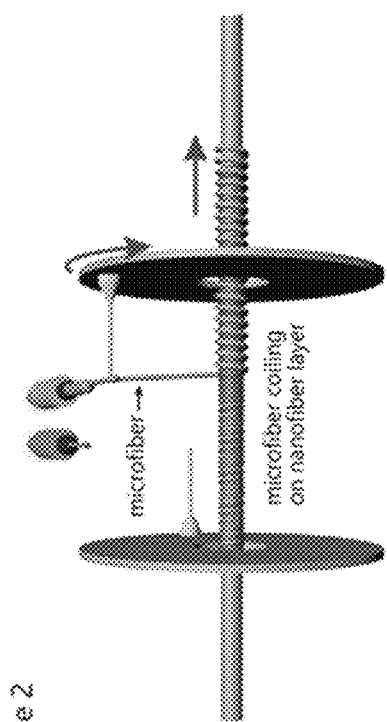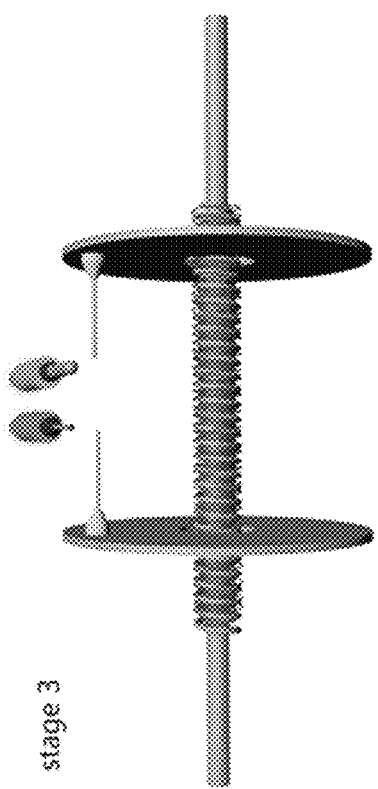

METHODS AND DEVICES FOR MULTI-LAYER NANOFIBERS

CROSS-REFERENCE TO RELATED APPLICATIONS

This application claims the benefit of and priority to U.S. Provisional Application Ser. No. 62/672,416, having the title "METHODS AND DEVICES FOR MULTI-LAYER NANOFIBERS", filed on May 16, 2018, the disclosure of which is incorporated herein by reference in its entirety.

BACKGROUND

Electrospinning process is a popular method to make nanofibers that utilizes high-voltage electrical field to stretch polymer droplets into nanofibers and highly depends on the dielectric properties of materials. There remains a need for methods and apparatus for making nanofibers that is not dependent upon the dielectric properties of the materials. These needs and other needs are satisfied by the present disclosure.

SUMMARY

Embodiments of the present disclosure provide for apparatus for making multi-layer fibers, methods for making multi-layer fibers, and the like.

An embodiment of the present disclosure includes a nanofiber spinning apparatus that can include at least one rotating plate having an aperture through which a core yarn passes. At least one post can contact the rotating plate. The apparatus can also include a speed control device configured to control rotation of the rotating plate and a dispensing device configured to dispense a nanofiber-forming material onto the post.

An embodiment of the present disclosure includes methods of making a core-sheath yarn that can include passing a core yarn through an aperture in a rotating plate. The plate can include at least one post. The post can be contacted with a nanofiber-forming material. The rotating plate can rotate to draw a fiber of nanofiber-forming material from the post, so that the fiber wraps around the core yarn.

Another embodiment of the present disclosure includes a nanofiber spinning apparatus that can include a pair of rotating plates. Each plate can have at least one post. The rotating plates can be configured so that plates are parallel and the sides having a post are facing each other. Each plate has an aperture through which a flexible core can pass. At least one speed control device can be configured to control the rotation of one or both of the pair of rotating plates. At least one dispensing device can be included that is configured to dispense a nanofiber-forming material onto a post. The nanofiber-forming material for each dispensing device can be the same type of nanofiber-forming material or a different type of nanofiber-forming material.

BRIEF DESCRIPTION OF THE DRAWINGS

Further aspects of the present disclosure will be more readily appreciated upon review of the detailed description of its various embodiments, described below, when taken in conjunction with the accompanying drawings.

FIG. 6A is a photograph of a touch spinning device of the present disclosure for making nanofibrous yarn. FIG. 6B is a schematic of an embodiment of a touch spinning device for nanofibrous yarn.

FIGS. 7A-C are SEM images of (FIG. 7A) core yarn, (FIG. 7B) longitude, and (FIG. 7C) cross section of core-sheath nanofibrous yarn prepared by a touch spinning device of the present disclosure.

FIG. 8 illustrates the influence of RPM on fiber diameter.

FIGS. 12A-C provides example embodiments of methods and devices for touch spun multi-layer fabrication with controlled porosity. According to various embodiments of the present disclosure, FIG. 12A shows coiled PCL nanofiber around a collector rod; FIG. 12B shows coiling of a microfiber with larger spiral spacing from the opposite direction; FIG. 12C shows a multilayer of nano- and microfibers with controlled porosity.

Figure 1A:
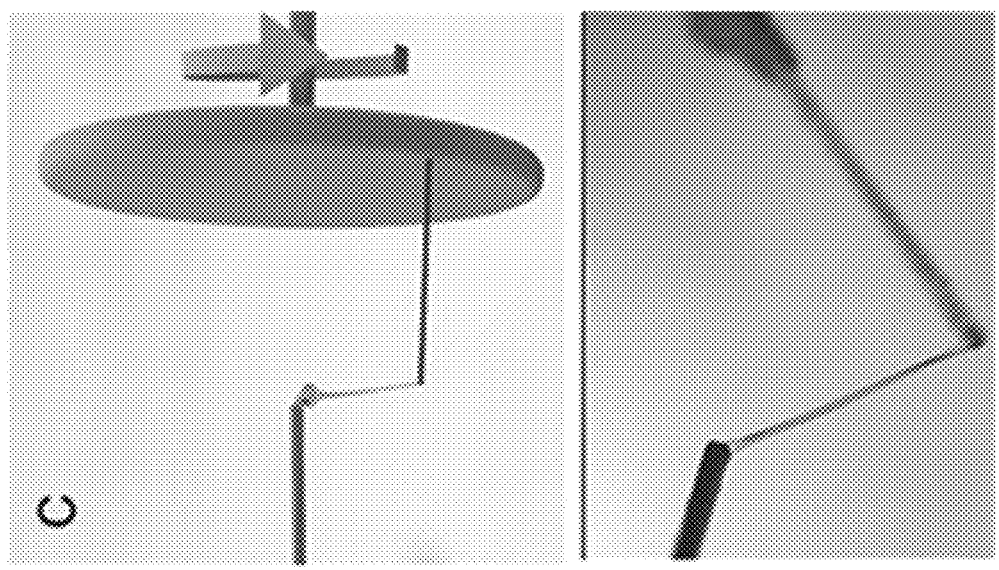
FIGS. 1A-C provide schematic examples of the touch spinning process.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

The present disclosure provides for customized devices based on touch spinning technology to develop nanofibrous core-sheath yarn. One or more layers of different nanofibers can be deposited or wound around core yarns (e.g. filament yarns, staple (or spun) yarns, wires, cables, fiber bundles, made of polymer fibers such as PP, PE, PVDF, PU, cellulose, protein, polyester, nylon, natural fibers (e.g. silk, wool, cotton)), PTFE rods, metal fibers/filaments (e.g. steel, silver, copper) carbon-based materials (e.g. carbon fibers, carbon nanotubes, or their blends) or combinations thereof with controlled fiber alignment, fiber spacing and blending.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, material science, and the like, which are within the skill of the art.

The following examples are put forth so as to provide those of ordinary skill in the art with a complete disclosure and description of how to perform the methods and use the devices and methods disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise.

Definitions

"Nanofiber" is a fiber having a radius on the nano-scale (e.g., 1 nm to 1000 nm).

"Polymer" is any natural or synthetic molecule that can form long molecular chains, such as nylons, polyethylene, polystyrene, polylactide, polyglycolide, polypropylene, polyacetylene, polyphenylene vinylene, polypyrrole, polyesters, polyurethanes, combinations of these, and blends of these.

"Core-sheath" as described herein, can be a material (e.g. a yarn, wire, cable, filament, rod) wrapped in or coated by a second material to form a sheath. The sheath can fully envelop the core material or can be wrapped around the core material in pattern which allow for some exposure to the core material. The sheath can be formed in multiple layers, can contain more than one material, or can be a combination of multiple materials and multiple layers.

General Discussion

In accordance with the purpose(s) of the present disclosure, as embodied and broadly described herein, embodiments of the present disclosure, in some aspects, relate to methods for producing nanofibrous core-sheath materials, devices for producing nanofibrous core-sheath materials, and products including nanofibrous core-sheath materials.

Touch spinning is a robust method to produce nanofibers by directly drawing from polymer solutions or melts using a rotating rod or rods. Compared to the electrospinning process, touch spinning is a lower-cost, more scalable process, and insensitive to polymer's dielectric properties. In touch spinning, a rod (also referred to as a post) attached to the rotating disk contacts the polymer solution or melt droplet during rotation and draws them into continuous nanofibers as a result of high mechanical stretch ratio.

In an aspect, the present disclosure includes devices for producing nanofibrous materials. Advantageously, the density and spacing of nanofibers around a core material such as a yarn or flexible core (e.g. yarn, wires, cables, fiber bundles, made of polymer fibers such as PP, PE, PVDF, PU, PCL, cellulose, protein, polyester, nylon, natural fibers (e.g. silk, wool, cotton), metal fibers/filaments (e.g. steel, silver, copper) carbon-based materials (e.g. carbon fibers, carbon nanotubes, or their blends) or combinations thereof can be manipulated by varying the speed and arrangement of components of the device. One or more layers of the same or different nanofibers can be deposited or wound around core filaments/yarns and the fiber alignment, fiber spacing and blending can be controlled.

The devices of the present disclosure allow for spinning of nanofibers that do not rely on the dielectrical or magnetic properties of the nanofiber-forming material, using instead simple force applied to materials with a high mechanical stretch ratio, such as the stretch ratios known for the synthetic and natural polymers listed herein. Most synthetic and natural polymers such as polyethylene oxide, polycaprolactone, polyacrylonitrile, polystyrene, polyvinyl acetate, polylactic acid, Teflon (copolymer of 2,2-bis(trifluoromethyl)-4,5-difluoro-1,3-dioxole), poly(3-hexylthiophene), MEHPPV (poly[2-methoxy-5-(2-ethylhexyloxy)-1,4-phenylenevinylene]), PVDF (polyvinylidene fluoride) and its copolymers, pectin, and alginate, chitosan, polyolefin, polyesters, cellulose, protein, can be used to fabricate fibers by touch spinning in their melt state, or solution state (dissolved in their respective solvents, such as DMF, acetone, DMAc, ethanol, water, chloroform, N-methylmorpholine oxide, Fluorinert FC-40, toluene, tetrahydrofuran, and carboxylic acid).

The touch spinning devices of the present disclosure can be used for nano core-sheath yarn fabrication and provide opportunities to develop nano-structured textile materials with different functions. This offers opportunities for the fabrications of nanofibrous materials for functional textile applications, like flexible electroconductive materials (yarns and fabrics), nanogenerators, sensors, transducers, supercapacitors and tissue engineering, by manipulating the deposition of different nanofibers with electroconductive, piezoelectric, semiconductor, biomedical or other properties. The touch spinning devices of the present disclosure and methods of making core-sheath yarn provide a brand new way to fabricate a class of nano-structured functional textile materials. Advantageously, characteristics of the resulting core-sheath materials (e.g. porosity, thickness, stretch, mechanical properties of fibers) can be tuned by adjusting variables in the apparatus configuration and/or materials used for the touch spinning.

Embodiments of the present disclosure include devices as above, where the device can have at least one rotating plate with an aperture for passing through a length of core yarn (e.g. core material as described above). The core yarn can have a diameter of about 5 μm to about 25 mm, or about 50 μm to about 200 μm. One or more posts can be in contact with the rotating plate or be integrally part of the rotating plate. The post, or touch rod, can have a length of about 1 cm to about 50 cm, or about 2 cm to about 6 cm and a diameter (if circular cross section) of about 1 um to about 3 mm, or about 100 μm to about 500 μm. The rotating plate, also referred to as a twist disk, can be a substantially flat surface (e.g. a stage or disk).

In various aspects, the device includes a dispensing device for dispensing a nanofiber-forming material onto the post. The dispensing device can be a syringe, a needle attached to a pump, extruder, or other delivery techniques known to those skilled in the art that could dispense a nanofiber-forming material at a controlled rate. In various aspects, the needle can can have different cross-sectional configurations (e.g. coaxial, bicomponent, tricomponent, star, multilobal). In various aspects, the dispensing device can be configured to dispense materials onto a single post or multiple posts, wherein each post can receive different materials.

In various aspects, the nanofiber-forming material can be a polymer solution (e.g. PVDF (polyvinylidene fluoride) in DMF, PCL (polycaprolactone) in chloroform, etc.) or polymer melt (e.g. PLA (polylactic acid), nylon, polyester, etc). Other components can be added, including nanofillers (e.g. ZnO, silver, copper, carbon based materials, and silica), which can be in the form of nanoparticles, nanowires, nanotubes, fibrils, etc. Other components could also include functional agents (e.g. Triclosan for antibacterial function).

In various embodiments, as the rotating plate spins, the nanofiber-forming material is drawn from the stationary delivery device (e.g., needle, syringe, extruder, etc.) to form a nanofiber via a post. The post is positioned a distance from the core yarn on the rotating plate so that as the plate moves, the nanofiber-forming material spans the distance between the post and the core yarn, forming a nanofiber. The device can be configured to control the diameter of the nanofiber by modifying one or more processing parameters, such as the size of the stage and distance between the post and the aperture, feed rate, circumferential speed of rotating, twist disk, and distance of post from delivery system. For example, the further from the core yarn the post is placed, the thinner the diameter of the fiber. The nanofiber is wrapped around the core yarn to form a sheath. The pattern, density, and composition of the sheath, along with the productivity of the devices can be optimized by modifying the setup of the device. For example, the device can include single or multiple rotating plates, and single or multiple posts. Each plate or post can have single or multiple dispensing devices for dispensing a nanofiber-forming material (e.g., the same or different types of material). Additionally, the yarn take up speed and the rotational speed of the rotating plate can be altered.

In various embodiments, the speed at which the rotating plate spins is controlled by a speed control device which can tune the voltage or current of motor that is connected to the rotating plate, such as a PWM controller. By changing the rotating speed of the rotating plate (also referred to as a touch spinning plate or twist disk) and take up speed of core yarn, the orientation, density and spacing of nanofibers can be manipulated. The rotating plate rotates from about 20 RPM to about 10000 RPM, or about 100 RPM to about 5000 RPM. The speed at which the core yarn passes through the aperture (e.g. yarn take up rate) can be controlled by a yarn winder device (also referred to as a feeding device) whose rotating speed could be controlled by changing the current or voltage of a motor connected to the device, and the core yarn can pass through the aperture at a rate of about 1 cm/min to about 1000 cm/min, or about 3 cm/min to about 100 cm/min.

Figure 2A:
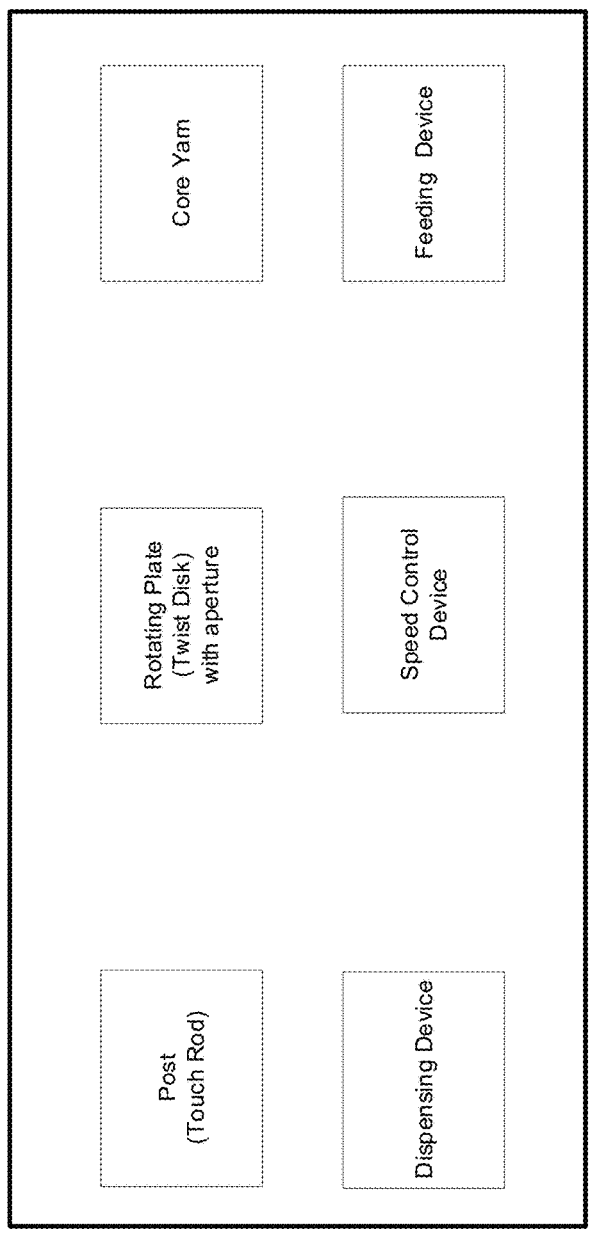
FIG. 2A is a block diagram illustrating some of the components of the touch spinning devices of the present disclosure.
Figure 2B:
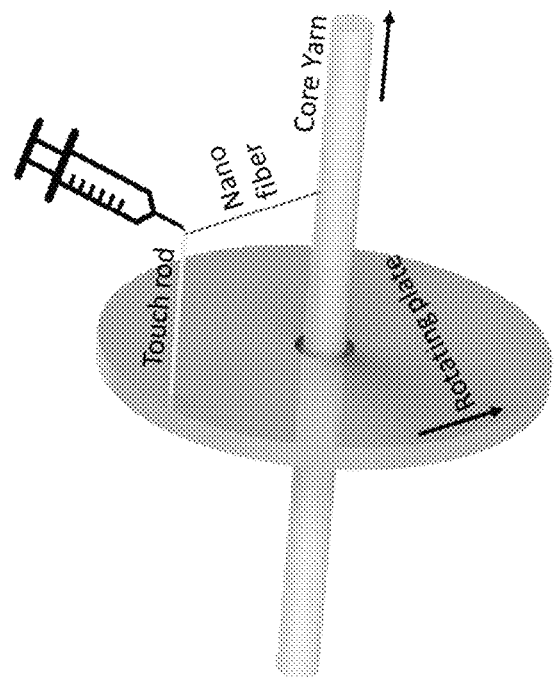
FIG. 2B provides an example embodiment of a basic touch spinning device used to make nanofibrous core-sheath yarn.

An example of a touch spinning device for forming a core-sheath yarn is shown in FIG. 2B. The core yarn, which can be fed by a feeding device, passes through an aperture in the rotating plate. The speed of the rotating plate can be controlled by the speed control device. Contacting the rotating plate is a post, which is oriented orthogonally to the surface of the rotating plate. The post is placed laterally to the aperture, such that the post rotates about the aperture as the rotating plate spins. A dispensing device dispenses a nanofiber-forming material such as a solution including a polymer onto the post. The method of forming a core-sheath yarn begins with dispensing the material onto the post. As the rotating plate spins, the material is drawn from the post to form nanofibers, which attach to the core yarn and wrap around the yarn. The process of forming fibers and wrapping can continue as long as material is dispensed onto the post and the plate spins. As mentioned above, the speed control device controls the revolutions per minute (RPM) of the rotating plate, and the feeding device controls the speed of the core yarn uptake. As these variables are manipulated, so is the resulting configuration and thickness of the sheath wrapping the core yarn. For example the, sheath can be from about 50 nm to about 100 μm, or about 300 nm to about 20 μm thick. The RPM of the rotating plate can be about 100 to about 2000 RPM.

Figure 3:
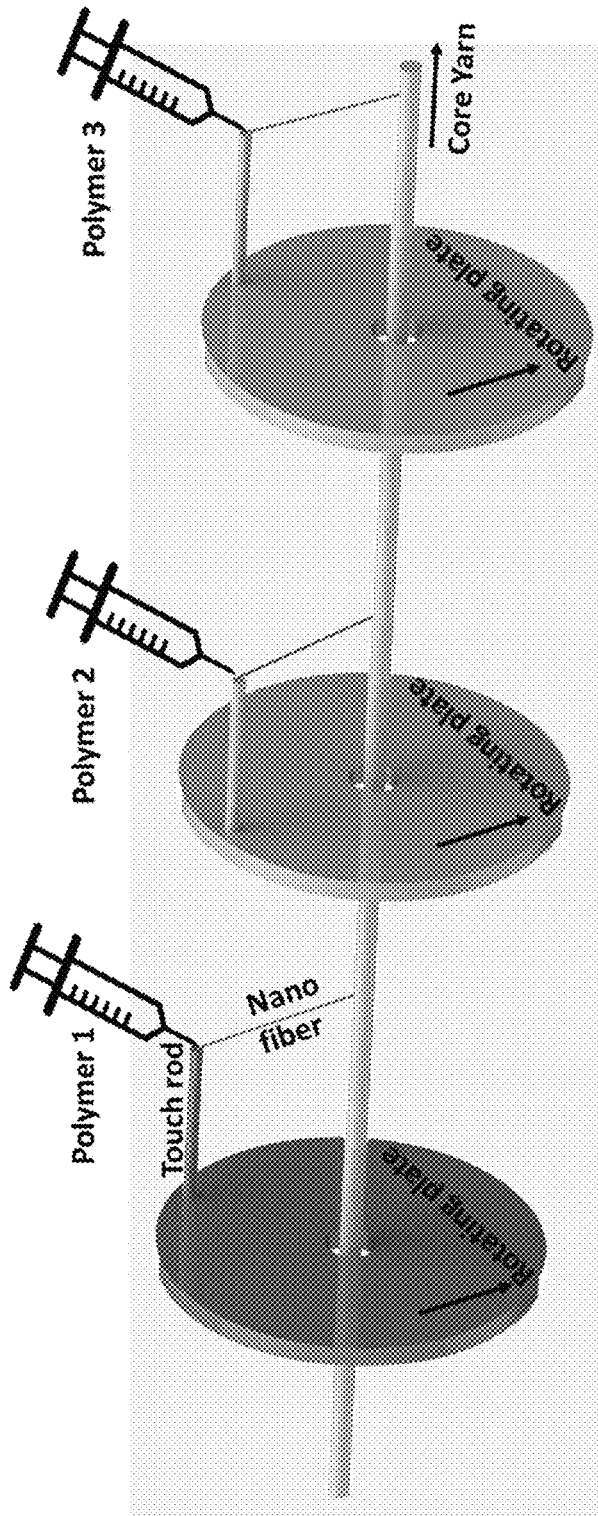
FIG. 3 provides an example embodiment of a touch spinning device used to make multiple-layer core-sheath yarn.

As described in detail in the examples, various configurations of the device can be altered to produce core-sheath materials having desired properties. For example, the device can contain a series of rotating plates configured in layers (e.g., each rotating plate in a parallel plane to one another), allowing the core yarn to pass through the respective apertures. An example of a layered device is shown in FIG. 3. The device as shown includes three rotating plate layers, but one skilled in the art can appreciate that the device could be configured to include any number of rotating plate layers, such as two, four, five, etc.) Each rotating plate includes one post and one dispensing device or could have multiple posts and multiple dispensing devices. As shown in the figure, each layer may be configured to dispense different nanofiber-forming materials to form a sheath with a combination of materials, or a multiple-layer core-sheath yarn. For example, the dispensing device of the first layer may dispense a first material, the dispensing device of the second layer may dispense a second material, and so forth. In this type of setup, the core-sheath yarn is formed by passing a core yarn through the apertures of the rotating plate layers in succession. As each rotating plate spins, each associated dispensing device dispenses nanofiber-forming material onto the post. The nanofiber-forming material is drawn into fibers toward the core yarn, wrapping around the core yarn to form a multilayered core-sheath yarn. Alternatively, each layer may be configured to dispense the same nanofiber-forming material, thereby increasing the speed at which the core is sheathed or increasing the thickness of the sheath. In various embodiments, the speed of each rotating plate layer can be independently controlled either by a single speed control device or by multiple speed control devices. The rotating plates can have the same diameter or different diameters.

Figure 4:
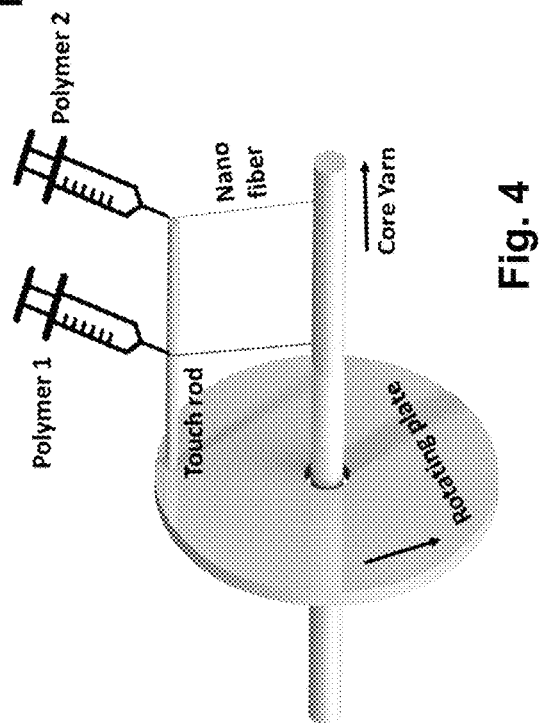
FIG. 4 provides an example embodiment of a touch spinning device with one plate used to make multilayered core-sheath yarn.

In various embodiments, such as the one shown in FIG. 4, the length of the post can be increased to accommodate two or more dispensing devices. The dispensing devices may dispense the same nanofiber-forming material or different nanofiber-forming materials. For example, the first dispensing device may dispense a first material, and the second dispensing device may dispense a second material. As the core yarn passes through the aperture of the rotating plate, the rotating plate spins and each dispensing device dispenses nanofiber-forming material onto the post. The nanofiber-forming material is drawn into fibers toward the core yarn, wrapping around the core yarn to form a multilayered core-sheath yarn, where the yarn is wrapped in both fibers from the first and the second materials. A rotating plate including two or more dispensing devices, such as the one shown in FIG. 4, could also be included in a multilayer device such as the one shown in FIG. 3.

Figure 5:
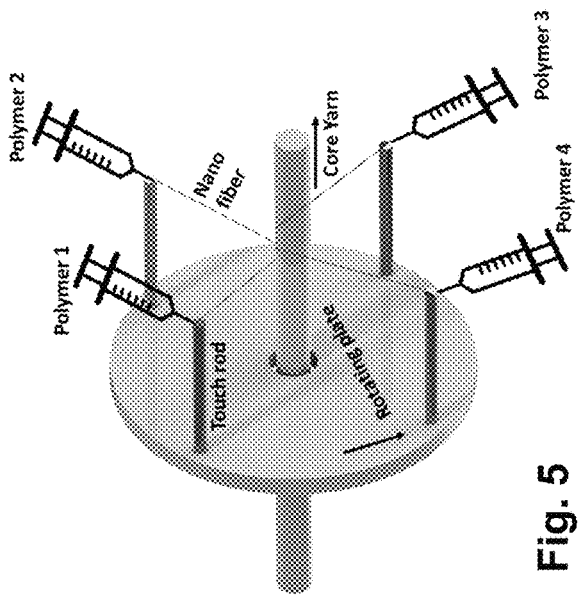
FIG. 5 provides an example embodiment of a touch spinning device used to make core sheath yarn containing multiple polymers in one layer.

In various embodiments, a rotating plate can have a single dispensing device for dispensing a nanofiber-forming material and a single post, or multiple dispensing devices per post. In other embodiments, such as the example multiple-post device of FIG. 5, a rotating plate can have more than one post disposed on its surface. The device shown in FIG. 5 includes four posts arranged substantially evenly spaced from one another and equidistant from the aperture. As can be appreciated, the number of posts associated can be varied (e.g. two posts, three posts, five posts, or more). In embodiments, each post can have a single dispensing device as shown, or can have multiple dispensing devices associated with it. The nanofiber-forming material dispensed on each post may be the same nanofiber-forming material or different nanofiber-forming materials. For example, the dispensing device of the first post may dispense a first material, the dispensing device of the second post may dispense a second material, and so forth. A core-sheath yarn is formed by passing a core yarn through the aperture of the rotating plate. As the rotating plate spins, each dispensing device dispenses nanofiber-forming material onto its associated post, and the nanofiber-forming material is drawn into fibers toward the core yarn, wrapping around the core yarn to form a multilayered core-sheath yarn. The multiple-post rotating plate shown in FIG. 5 can also be included in a multi-plate device, such as the device of FIG. 3, to form a layered multi-post device.

In various embodiments, multilayer coiled fibers can be produced. In an embodiment, at least two rotating plates including touch rods as described above can be configured in pairs so that the touch rods are facing one another. A first material can be spun around a scaffold passed through the plates' apertures in a first direction to form a first coiled layer. The scaffold can then be passed through the plates' apertures in the opposite direction as a second material is coiled around the first coiled layer to form a second coiled layer. The first and second layers can be the same or different from one another, depending on the desired properties of the resulting fibers. The process can be repeated until the desired porosity and layer thickness is achieved. Advantageously, the layer porosity can be tuned easily by controlling the collection rod displacement (or speed at which the scaffold is passed though the apertures), the disc rotation and the thickness of the fibers dispensed from the dispensing devices. The materials can be nanofiber-forming materials, microfiber forming materials, or a combination thereof.

In various aspects, devices such as the one shown in FIGS. 12A-C, can be configured to produce multilayer coiled fibers as described above. The device can be configured so that the speed of the scaffolding passing through the apertures can be the same in both directions, or different. In embodiments, the scaffold can be a collector rod. In embodiments the scaffold can be e.g. a rod, a fiber, a wire, a prosthetic device.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, "about 0" can refer to 0, 0.001, 0.01, or 0.1. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

EXAMPLES

Figure 1B:
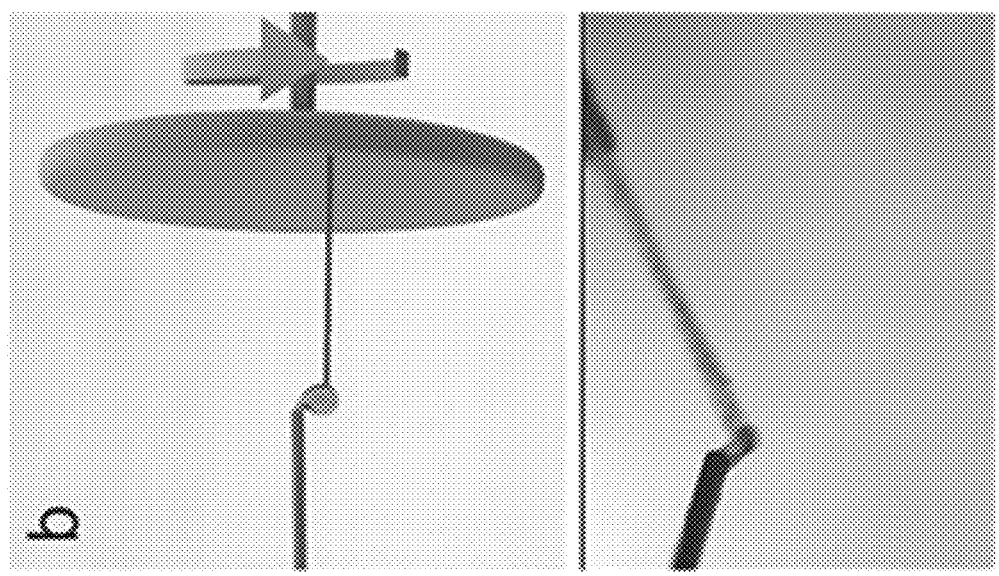
Figure 1C:
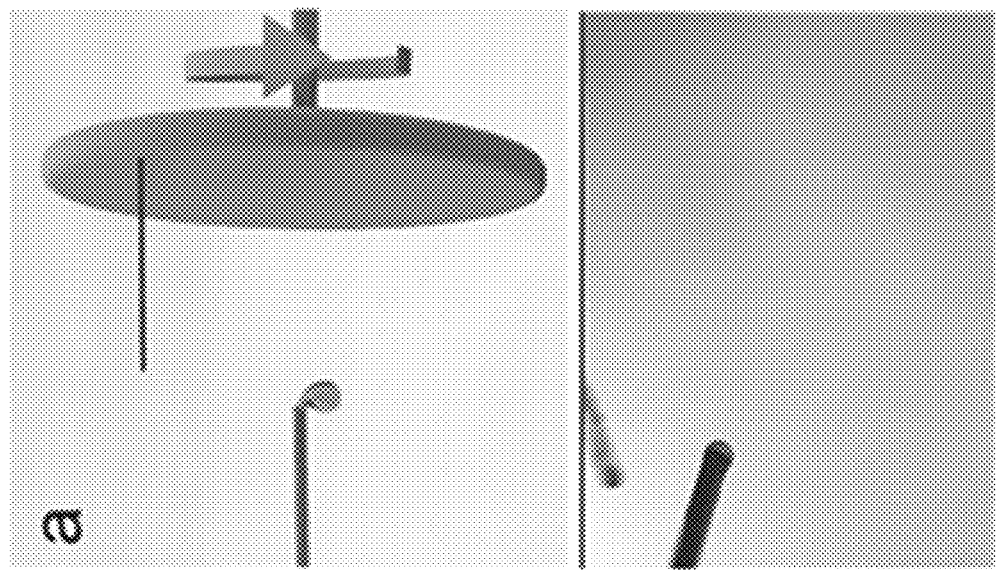

In touch spinning, as shown in FIGS. 1A-C, a rod attached to the rotating disk contacts the polymer solution or melt droplet during rotation and draws them into continuous nanofibers as a result of high mechanical stretch ratio. The devices and methods described herein produce touch-spun nanofibers that form a sheath around a core material such as a yarn.

FIGS. 2A-B show a basic schematic of an example touch spinning device for core-sheath yarn fabrication. The rotating touch rod draws polymer solutions or melts into nanofibers and wraps them around a core yarn. By changing the rotating speed of touch spinning plate (twist disk) and take up speed of core yarn, the orientation, density and spacing of nanofibers can be manipulated. Productivity of nanofibers can be further increased by incorporating additional touch rods and rotating plates.

By incorporating several touch spinning plates, as shown in FIG. 3, core-sheath yarn with multiple nanofibrous layers consisting of different polymers can be developed. More needles can be attached to the disk to increase productivity.

By extending the length of the touch-rod (post), a touch-spinning device with one plate can also be used to make multilayered core-sheath yarn, as shown in FIG. 4. More needles can be attached to the disk. Nano core-sheath yarns with a nanofibrous layer containing blend of polymer nanofibers can be developed using the device shown in FIG. 5. By adjusting the position of touch-rods, each touch-rod can only touch one syringe needle during one complete rotation.

Results:

The device illustrated in FIGS. 2A and 2B was reduced to practice, and its picture and an example schematic are shown in FIGS. 6A-B. Touchspun nanofibers were successfully deposited around the smooth core yarn (FIG. 7A) from a Polyvinylidene fluoride solution (for demonstration), and an even nanofibrous layer can be observed in FIGS. 7B-C.

The influence of processing parameters to manipulate the structure of nanofiborus layer was initially investigated by changing the RPM (Revolutions per minute) of the rotating disk, the take up speed of the yarn, and the concentration of the polymer solution. In one test, the RPM of the rotating disk was changed from 500 RPM to 2000 RPM and other parameters were set as 12 wt % PVDF solution (in DMF, PVDF:PEO=50:1), take up speed: 3.4 cm/min, feed rate of polymer solution: 0.2 ml/h. The diameter of nanofibers can be decreased by increasing the RPM, as shown in FIG. 8.

Figure 9A:
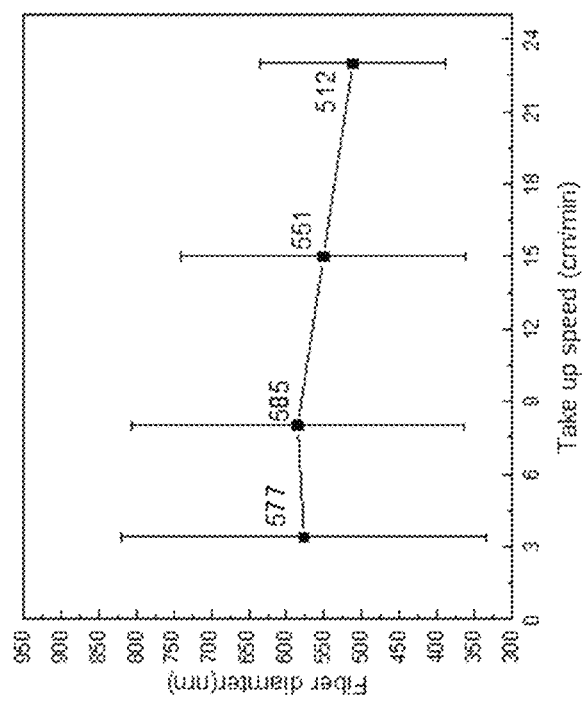
FIGS. 9A-B illustrate the influence of take-up speed on (FIG. 9A) fiber diameter and (FIG. 9B) thickness of the nanofibrous layer.
Figure 9B:
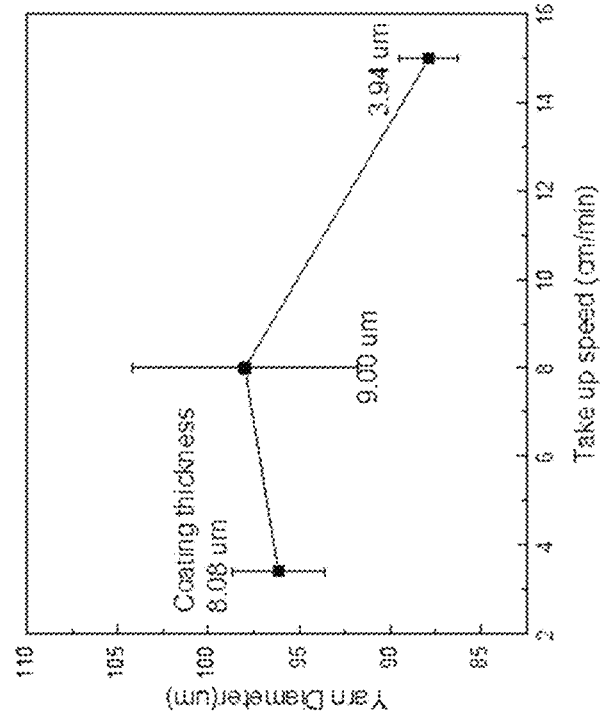
Figure 10A:
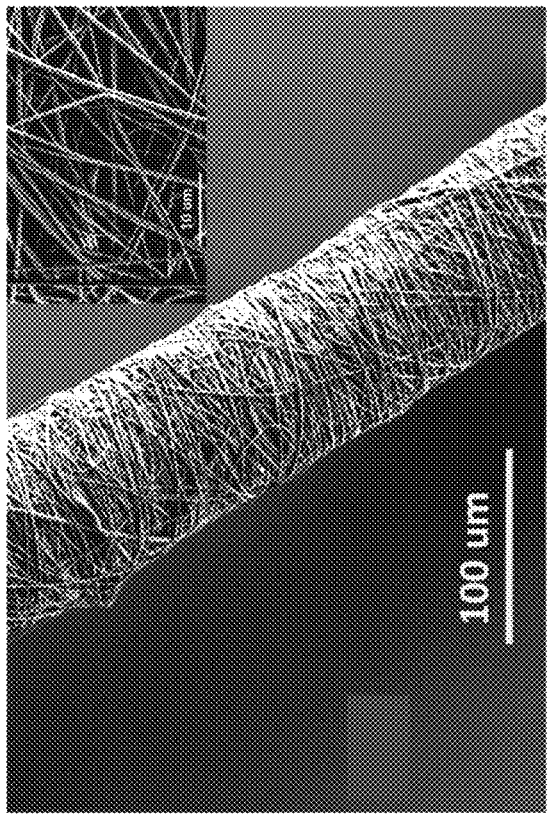
FIGS. 10A-B are SEM images of nanoyarn prepared with take-up speed of (FIG. 10A) 3.4 cm/min, and (FIG. 10B) 23 cm/min.
Figure 10B:
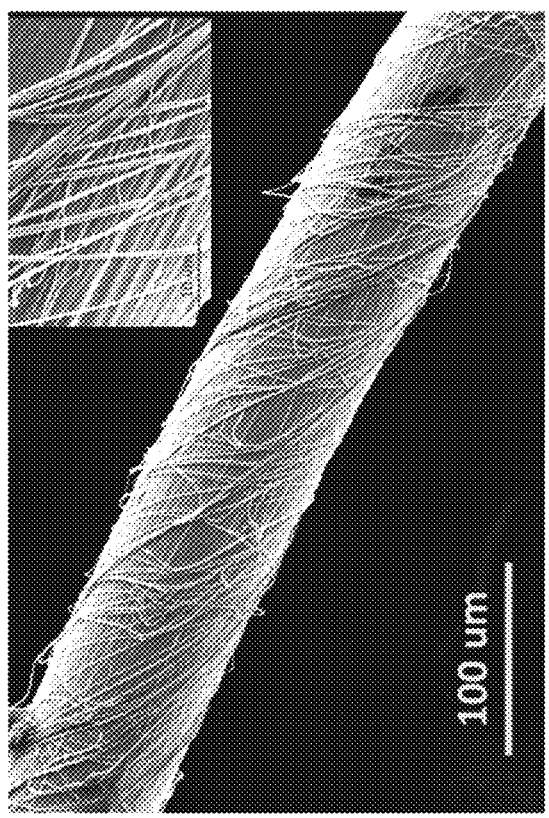

In a second test, Take up speed of yarn was set as 3.4, 8, 15 and 23 cm/min, respectively, and other parameters were kept constant (2000 RPM of rotating disc, 12 wt % PVDF solution (in DMF, PVDF:PEO=50:1), feed rate of polymer solution: 0.2 ml/h). The change of diameter of nanofibers was insignificant, as shown in FIG. 9A. The thickness of nanofibrous layer decreased with higher take-up speed (FIG. 9B). It can be clearly observed that the orientation of nanofibers were well controlled by changing take-up speed of yarn. The SEM images in FIGS. 10A-B show that the increased take up speed has less coverage of nanofiber layers.

Figure 11A:
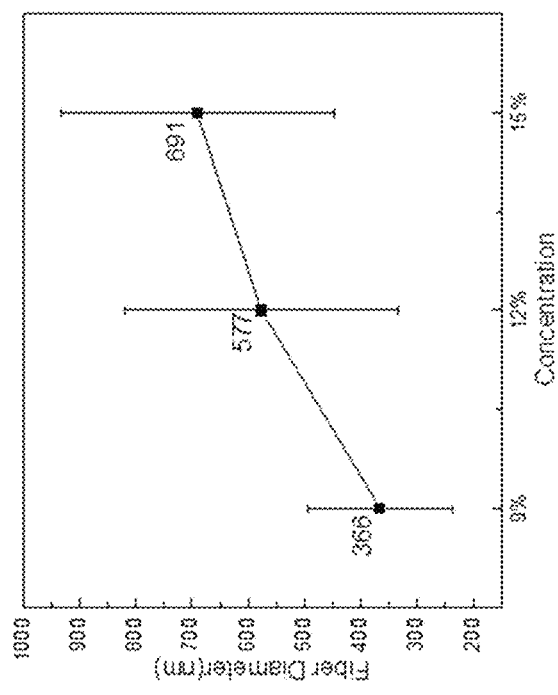
FIGS. 11A-B illustrate the Influence of concentration on (FIG. 11A) fiber diameter and (FIG. 11B) the thickness of nanofibrous layer.
Figure 11B:
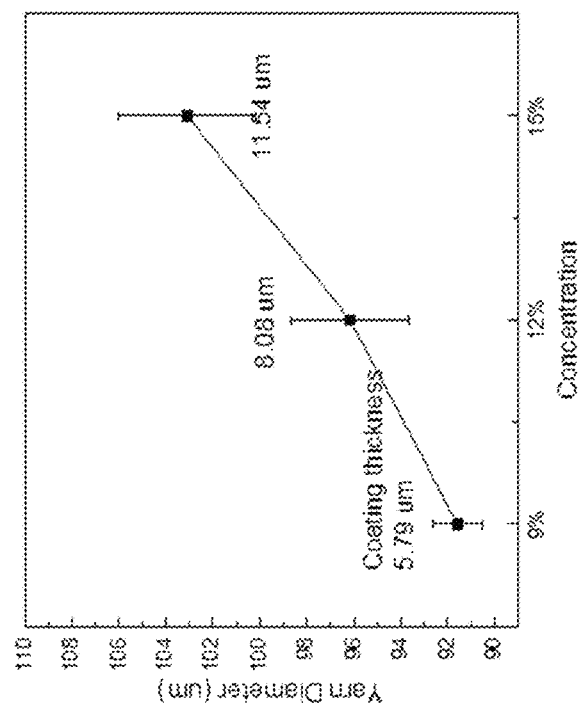

In another test, the concentration of polymer solution was set as 9%, 12%, and 15% respectively, and other parameters were kept constant (2000 RPM of rotating disc, PVDF:PEO=50:1, feed rate of polymer solution: 0.2 xml/h, take up speed: 3.4 cm/min). The average diameter of nanofibers was decreased from 691 nm to 366 nm by using lower concentration, as shown in FIG. 11A. The coating thickness was increased with higher concentration of polymer solution (FIG. 11B).

In another setup, a multi-layer of micro and nanofibers with varying diameter and controlled porosity can be produced with different fiber materials simultaneously using the device configuration such as the one presented in FIGS. 12A-B. In this configuration, two rotating discs are employed with touch-rods facing each other as shown in FIG. 12A. The nanofiber scaffold could be spun around a suitable rod of desired diameter. The core rod can make a back-and-forth motion through the rotating disc core in y-direction. In the first stage, the core rod could be controlled to move in the negative y-direction with a constant speed and nanofibers are coiled around the tube drawn by the touch-rod from polymer solution 1 (red) dispensed through the syringe 1 (FIG. 12A). In the second stage (FIG. 12B), a microfiber (eg. >10 µm) as second layer could be coiled with larger spiral loop spacing on the nanofiber layer. In stage 3 (FIG. 12C), the process is repeated until the desired layer thickness and porosity is achieved. The layer porosity can be tuned easily as desired by controlling the collection rod displacement, the disc rotation and the microfiber thickness.

Other configurations are also possible. For example, the multi-layers can be formed with a thicker fiber (e.g. microfibers) as the first layer, with a thinner fiber (e.g. nanofibers) as the next layer. Alternatively, the reverse can be true, namely nanofiber can be the first layer, followed by microfiber on top. The speed in the y-direction and negative y-direction can be the same or different. Both rotating/twisting discs can start spinning concurrently, thus increasing the productivity. Combinations of any of these configurations can be used to tune the resulting fibers.

REFERENCES (1) Tokarev, A.; Asheghali, D.; Griffiths, I. M.; Trotsenko, O.; Gruzd, A.; Lin, X.; Stone, H. A.; Minko, S. Touch-and Brush-Spinning of Nanofibers. Advanced Materials 2015, 27 (41), 6526-6532.

What is claimed is:

1. A nanofiber spinning apparatus comprising:
   at least one rotating plate having an aperture through which a core yarn passes, at least one post contacting the rotating plate wherein the post is parallel to the core yarn, a speed control device configured to control rotation of the rotating plate, and a dispensing device configured to dispense a nanofiber-forming material directly onto a free end of the post, wherein a number of dispensing devices is equal to or greater than a number of the posts.

2. The apparatus of claim 1, wherein the post is positioned a distance from the core yarn on the rotating plate, wherein a fiber formed by the nanofiber-forming material spans the distance between the post and the core yarn.

3. The apparatus of claim 2, wherein the speed control device is configured to move the post by rotation of the rotating plate, wherein the dispensing device is configured to flow the nanofiber-forming material as the speed control devices causes movement of the post, wherein the rotating plate and the core yarn are positioned so that movement of the post draws the fiber and causes the fiber to wrap around the core yarn.

4. The apparatus of claim 1, wherein the speed control device is configured to rotate the rotating plate at about 100 to about 2000 RPMs.

5. The apparatus of claim 2, wherein each post is associated with one or more dispensing devices, and wherein the nanofiber-forming material for each dispensing device is the same or different.

6. The apparatus of claim 1, further comprising a feeding device configured to control a speed at which the core yarn passes through the aperture.

7. The apparatus of claim 6, further comprising a plurality of rotating plates positioned in parallel planes to allow the core yarn to pass through respective apertures.

8. The apparatus of claim 7, wherein each of the rotating plates has at least one dispensing device and at least one post, and wherein the nanofiber-forming material for each dispensing device is the same type of nanofiber-forming material or a different type of nanofiber-forming material.

9. A method of making a core-sheath yarn comprising:
   passing a core yarn through an aperture in a rotating plate, wherein the plate comprises at least one post, wherein the post is parallel to the core yarn;
   dispensing a nanofiber-forming material from a dispensing device, wherein a number of dispensing devices is equal to or greater than a number of the posts;
   contacting a free end of the post with the nanofiber-forming material; and rotating the rotating plate to mechanically draw a fiber of nanofiber-forming material from the post, wherein the fiber wraps around the core yarn.

10. The method of claim 9, wherein the core yarn is selected from filament yarns, staple yarns, wires, and cables.

11. The method of claim 9, wherein the nanofiber-forming material comprises polymer melts or a polymer solution.

12. The method of claim 9, wherein a pattern, a density, or both of the fiber wrapping around the core yarn is controlled by adjusting one or more of:
   placement of the at least one post in relation to the core yarn;
   speed of rotation of the rotating plate;
   a speed at which the core yarn is passed through the aperture;
   a quantity of posts on the rotating plates; and
   a quantity of rotating plates.

13. The method of claim 9, wherein a plurality of nanofiber-forming materials are contacted with a single post.

14. The method of claim 9, wherein a plurality of posts are contacted with nanofiber-forming materials, and wherein the materials contacted with each post may be are the same or different.

15. The method of claim 12, wherein the core yarn passes through a series of rotating plates that are in parallel planes to allow the core yarn to pass through the respective apertures.

16. A nanofiber spinning apparatus comprising:
   a pair of rotating plates each having at least one post on a first side, wherein the rotating plates are configured so that plates are parallel and the first sides are facing each other, and wherein each plate has an aperture through which a flexible core passes;
   at least one speed control device configured to control the rotation of one or both of the pair of rotating plates; and
   at least one dispensing device configured to dispense a nanofiber-forming material onto a free end of a post, wherein the nanofiber-forming material for each dispensing device is the same type of nanofiber-forming material or a different type of nanofiber-forming material.

17. The apparatus of claim 16, wherein the speed control device is configured to rotate the rotating plate, wherein the dispensing device is configured to flow the nanofiber-forming material onto the post as the speed control devices causes the rotation, wherein the rotating plate and the flexible core are positioned so that movement of the post mechanically draws a fiber formed from the nano-fiber-forming material and causes the fiber to wrap around the flexible core.

18. The apparatus of claim 16, wherein the speed control device is configured to rotate the rotating plate at about 100 to about 2000 RPMs.

19. The apparatus of claim 16, further comprising a feeding device configured to control the speed at which the flexible core passes through the aperture.

* * * * *